United States Patent [19]

Weiss et al.

[11] 4,097,161
[45] Jun. 27, 1978

[54] COUPLING WITH OVERLOAD SAFETY DEVICE

[75] Inventors: Hermann Weiss, Kaarst; Hans Wellkamp, Wittlaer, both of Germany

[73] Assignee: Atec-Weiss KG, Kaarst, Germany

[21] Appl. No.: 807,339

[22] Filed: Jun. 16, 1977

[30] Foreign Application Priority Data

Sep. 11, 1976 Germany .............................. 2640989

[51] Int. Cl.² .............................................. F16D 9/00
[52] U.S. Cl. ...................................... 403/2; 64/28 R; 403/202
[58] Field of Search .................... 403/2, DIG. 3, 202, 403/203, 204; 64/28 R; 233/1 B, 26, 23 R

[56] References Cited

U.S. PATENT DOCUMENTS

| | | | |
|---|---|---|---|
| 490,313 | 1/1893 | Schlickeysen | 403/2 X |
| 1,326,869 | 12/1919 | Junggren | 403/202 X |
| 1,498,281 | 6/1924 | Jones | 64/28 R |
| 3,662,619 | 5/1972 | Seeliger | 233/1 B |
| 3,747,196 | 7/1973 | Whittington | 403/2 X |
| 3,990,633 | 11/1976 | Stahl | 233/26 X |
| 4,040,766 | 8/1977 | Sekido et al. | 64/28 R X |

*Primary Examiner*—Wayne L. Shedd
*Attorney, Agent, or Firm*—Haseltine, Lake & Waters

[57] ABSTRACT

A coupling apparatus where two coaxially held coupling halves are connected by a tensioning member provided with a predetermined breaking point. The tensioning member secured at one end to its associated coupling half, is radially and tangentially displaced with respect to the end of the tensioning member secured to the other coupling half. At the overload condition, one coupling half makes a complete rotation, after breaking, with respect to the other coupling half. A rotary escapement is provided as a holding structure so that when one element of the tensioning member swings, it does so out of the path of the other.

7 Claims, 2 Drawing Figures

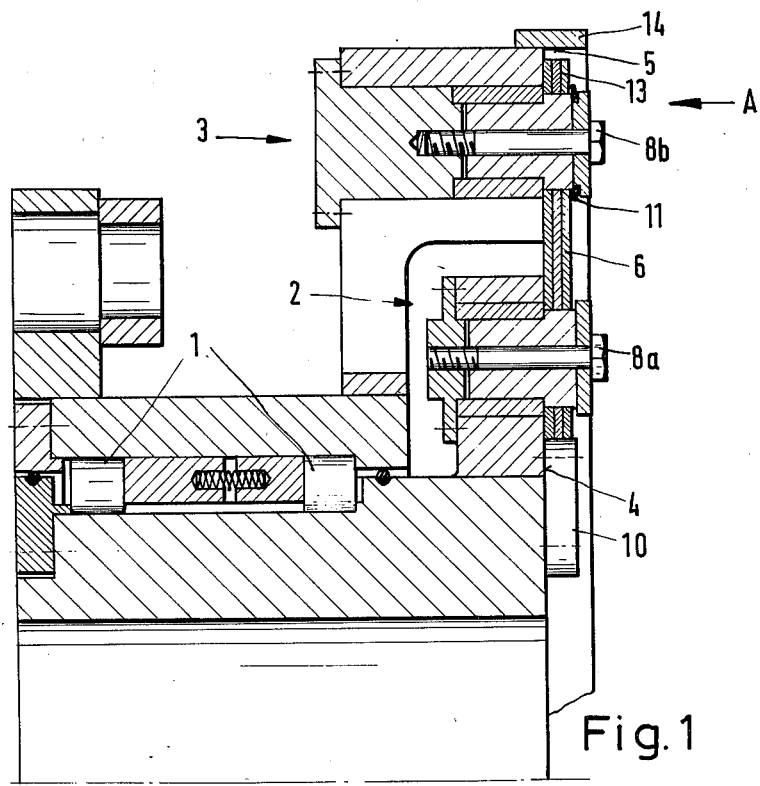
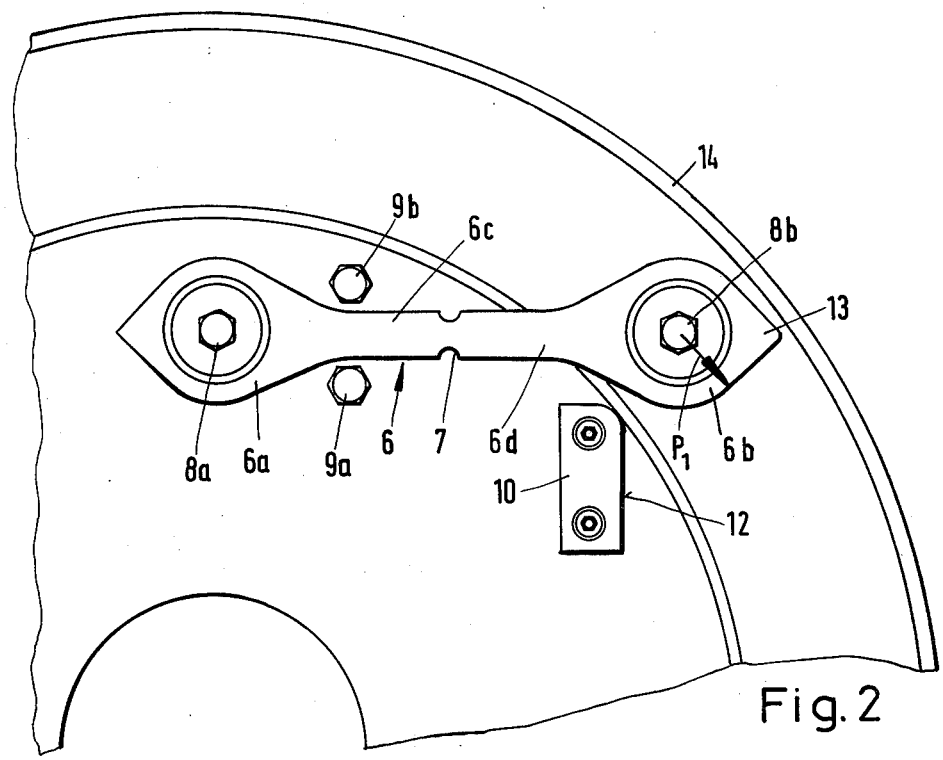

COUPLING WITH OVERLOAD SAFETY DEVICE

BACKGROUND OF THE INVENTION

The present invention relates to a coupling apparatus. More particularly where two coaxially held coupling halves are connected to one another by a tension member having a predetermined breaking point. In this connection the end of the tension member secured to one coupling half is radially and tangentially displaced to the end of the tension member secured to the other coupling half.

In prior art coupling devices of this type, the points securing the tension member are not only arranged so as to be displaced radially and tangentially to one another, but also axially. This axial displacement is necessary with the known coupling devices to permit free space to exist between the two parts of the tension member at both sides of the predetermined breaking point. With the result that one of the tension members can move past the other part of the tension member after the tension member has been broken. A disadvantage of this arrangement, is that due to the axial displacement of the secured ends of the tension member, axial forces introduced by the transmission of torque, are introduced into the two coupling halves subjected to axial displacement. There is a further known disadvantage when using fish plates as tension members, in that the fish plates must have kinks at their secured ends.

SUMMARY OF THE INVENTION

The principal features of the invention relate to a coupling employing a tension member positioned at both sides of a holding assembly having a predetermined breaking point. Movement of the two parts of said tension member as a result of the centrifugal forces acting thereon after the tension member has broken is limited, whereby a stop carried by the coupling half associated with a first part of said tension member, is in the path of movement of the second part of the tension member, enabling the second part of the tension member to swing out of the path of movement of the first part of the tension member.

In the coupling according to the invention, both parts of the tension member can pass one another despite their being arranged in the same radial plane after the tension member has broken. When the second part of the tension member has been swung by the stop, it is held in this position and no longer touches the first part of the tension member.

In principle the stop can be formed for cooperation with the swinging of the second part of the tension member by the first part of the tension member or its holding assembly, by means of stops disposed at both sides of the fish plate. However, it is preferable that a specific structure be employed which is in the direction of rotation directly in front of the tension member.

Also, within the scope of the invention, is a rotary escapement means provided as holding means for that part of the tension member which is to be swung out of the path of movement of the first part of the tension member. The rotary escapement means may comprise springs, in particular plate springs, clamped together with the part of the fish plate by a bolt. Furthermore, in order to prevent both parts of the tension member from colliding after the tension member has broken and when the holding means of the second part of the tension member fails to swing or after this part has swung back, a special stop can have an abutting surface or edge on its reverse side, which swings the second part of the tension member back again.

The main object of the invention is to overcome the defects of the prior art.

Another object of the invention is to provide a coupling with an overload safety device in which both parts of the tension member can pass each other and not introduce any forces into the coupling.

Other objects and advantages will be better understood with respect to the accompanying specification, claims and drawings.

IN THE DRAWINGS

FIG. 1 illustrates a partial sectional view of the coupling.

FIG. 2 illustrates a fragmentary view of the coupling according to FIG. 1 as viewed along line of sight A.

PREFERRED EMBODIMENT

The two coupling halves 2, 3 as shown in FIG. 1 are held together coaxially by a bearing 1 and comprise two flanges, whose faces 4, 5 lie in the same radial plane. The coupling half 3 is connected to the drive means and coupling half 2 to the driven means. The direction of rotation of the torque to be transmitted is indicated by the arrow $P_1$.

The two coupling halves 2, 3 are connected to one another by a pack comprising fish plates 6, which have a reduced cross-section in their centre as predetermined breaking point 7 (See FIG. 2). One end 6a of the fish plates 6 is secured to the coupling half 2 and the other end 6b to the coupling half 3 by means of screw bolts 8a, 8b. The points securing ends 6a, 6b of the fish plates 6 are displaced tangentially for transmission of the torque. Furthermore, the points securing 6a, 6b are radially displaced with respect to the width of the ends 6a, 6b of the fish plate, so that the ends 6a, 6b of the fish plates 6 can pass one another when both coupling halves 2, 3 rotate relative to one another.

In order that a first part 6c of the fish plates 6 does not swing outwardly after the fish plates 6 have broken, stops 9a, 9b designed as bolts, are provided on the coupling half 2 at both sides. The coupling half 2 employs a special stop 10 for the second part 6d of the fish plates 6. This stop 10 is arranged in the path of movement of the second part 6d of the fish plates 6 which has not swung, so that the second part 6d of the fish plates 6 abuts the stop 10 and is swung clockwise. This swinging action by having the end 6b of the fish plates 6 secured, so as to be prevented from turning. The aforementioned is carried out by employing a plate spring 11, which is clamped together with the fish plates 6 via bolt 8. As a result, the second part 6d of the fish plates 6 is held in the swung position.

The second part 6d of the fish plates 6 has a nose 13 on the opposite side of its end 6b for which a stop ring 14 carried by the coupling half 3 is provided. The nose 13 acting together with the stop ring 14 prevents second part 6d of fish plates 6 from swinging out after a break towards the inside.

Should the second part 6d of the fish plates 6 be in the path of movement of the first part 6c of the fish plates 6 (after breaking) for any reason, i.e. whether due to the rotary escapement means not working or due to the second part 6d of the fish plates 6 being swung back by mechanical action; then the two parts 6c, 6d of the fish plates 6 cannot collide when rotating in a direction opposite to arrow $P_1$. This is due to the fact that the stop 10 arranged directly in front of fish plates 6 has an abutting surface 12 on its reverse side which swings the second part 6d of the fish plates 6 out of the path of movement of the first part 6c of the fish plates 6. Even if the fish plates 6 should break when rotating in the opposite direction of the determined direction of rotation, the abutting surface 12 ensures that the second part 6d of the fish plates 4 swings out of the path of movement of the first part 6c of the fish plates 6.

The coupling according to the invention, therefore, achieves transmission of torque with the assistance of an overload safety device without axial forces being introduced into the coupling halves. At an overload condition, one coupling half makes a complete rotation with respect to the other coupling half after breaking.

Many modifications and variations of the present invention are possible in light of the above teachings. It is, therefore, to be understood that within the scope of the appended claims, the invention may be practiced otherwise than as particularly described.

What we claim is:

1. A coupling apparatus employing two coaxially held coupling halves connected to one another by a tension member having a predetermined breaking point, said tension member secured to one coupling half at one end and is radially and tangentially displaced to the other end of the tension member which is secured to the other coupling half, said apparatus including: a movable element (6c, 6d) of said tension member positioned at both sides of a predetermined breaking point (7) of said tension member, holding means (9a, 9b, 11) disposed in proximity to said tension member which limit the swinging of the movable elements (6c, 6d) of said tension member by centrifugal forces acting thereon after the tension member (6) has broken; a stop means (10) carried by a coupling half (2) associated with a first moveable element (6c) of said tension member (6), being provided in the path of movement of a second movable element (6d) of the tension member (6), whereby the second movable element (6d) is adapted to swing out of the path of movement of the first movable element (6c) of said tension member (6).

2. A coupling apparatus as claimed in claim 1, wherein: said holding means (9a, 9b) for the first movable element (6c) of the tension member (6) is disposed on either side of said holding means.

3. A coupling apparatus as claimed in claim 1, wherein: holding means (11) for the second movable element (6d) of the tension member (6) is defined by rotary escape means.

4. A coupling apparatus as claimed in claim 1, wherein: plate springs (11), being clamped together with second movable element (6d) of the fish plate by bolt means (8a, 8b).

5. A coupling apparatus as claimed in claim 1 wherein: stop means (10) is arranged in the direction of rotation of said tension member (6).

6. A coupling apparatus as claimed in claim 1 wherein: said stops means (10) has an abutting edge (12) on one side.

7. A coupling apparatus as claimed in claim 1 wherein: the second movable element (6d) being provided with a nose shaped structure (13) on the reverse side of one end (6b), in cooperative relation to stop means (14) provided on the respective coupling half (3).

* * * * *